United States Patent [19]

Baker et al.

[11] 3,853,925
[45] Dec. 10, 1974

[54] URETHANES

[75] Inventors: Crispin Stuart Leworthy Baker, Hertford; Douglas Barnard, Welwyn Garden City; Maurice Read Porter, Stevenage, all of England

[73] Assignee: The Natural Rubber Producers Research Association, London, England

[22] Filed: Aug. 17, 1971

[21] Appl. No.: 172,589

[30] Foreign Application Priority Data
Aug. 18, 1970 Great Britain.................... 39804/70

[52] U.S. Cl.. 260/396 N, 260/77.5 CR, 260/79.5 P, 260/83.3, 260/85.1, 260/92.3, 260/94.7 R, 260/390, 260/391, 260/393, 260/768, 260/775
[51] Int. Cl............................................. C07c 131/08
[58] Field of Search ........ 260/396 N, 390, 391, 393

[56] References Cited
UNITED STATES PATENTS
3,352,750    11/1967    Buntin ............................ 260/396 N OTHER PUBLICATIONS
Migrdichian, Arg. Syn., v. 1, (1957), p. 448–449.

Primary Examiner—Vivian Garner
Attorney, Agent, or Firm—Wenderoth, Lind & Ponack

[57] ABSTRACT

The invention provides new chemical compounds having the general formula:

R(.NH.CO.O.N=Q=O)$_m$ (.NCO)$_n$ (.NH.CO.YX)$_p$ where
$m \geq 1$
$n \geq 0$
$p \geq 0$
$(n + p) \geq 1$
Q is an aromatic group in the quinonoid form,
R is an aromatic or saturated aliphatic group having a functionality of $(m + n + p)$,
Y is an oxygen atom and X is an aromatic or saturated aliphatic group, or
YX is an aromatic or saturated aliphatic substituted amino group.

The compounds have utility as vulcanizing agents for natural and unsaturated synthetic rubber.

4 Claims, No Drawings

URETHANES

The present invention relates to certain urethanes, to their preparation, and to their use as rubber additives.

Our U.S. Pat. U.S. application Ser. No. 862,507, now patent No. 3,645,980, relates to a method of cross-linking a natural or synthetic rubber, which method comprises reacting the rubber with an aromatic nitroso-compound, e.g. 4-nitrosophenol, and reacting pendent amino or hydroxyl groups in the resulting product with a polyfunctional linking agent, particularly a di- or polyisocyanate, so as to cross-link the rubber.

According to a preferred aspect of our prior application, the aromatic nitroso-compound and the linking compound are added to the rubber in the form of a pre-reaction product of a nitrosophenol with a di- or poly-isocyanate. The pre-reaction product is formed by a reaction between the isocyanate and the nitrosophenol in its oxime form, which may be exemplified as:

2 O = N — Ar — OH ⇌ HO — Q = O + OCN — R — NCO → O = Q = N — O — CO — NH — R — NH — CO — O — N = Q = O where R is an organic difunctional group, Ar is an aromatic group and Q is the aromatic group in its quinonoid form. This diurethane is believed to subsequently decompose at an elevated temperature to give the nitrosophenol and the di-isocyanate which then vulcanize the rubber.

The use of a pre-reaction product of this type provides equal numbers of nitrosophenol molecules and isocyanate groups in the rubber mix. In fact, it has been found desirable to add an excess of di-isocyanate to increase the crosslinking efficiency of the system. Thus, our U.S. Pat. application Ser. No. 862,507 contemplates the use of from 2 to 10 phr of diurethane and up to 6 phr of an excess of di-isocyanate.

It is a disadvantage of this prior system that many of the available di-isocyanates are toxic and could not readily be handled in the free state by the rubber industry. In one aspect, the present invention seeks to avoid this disadvantage by providing urethanes which are capable of decomposing to give more isocyanate groups than nitrosophenol molecules.

Accordingly, this invention provides in one aspect a compound having the general formula:

R(.NH.CO.O.N = Q = O)$_m$ (.NCO)$_n$ (.NH.CO.YX)$_p$ where $m \geq 1$, preferably 1 or 2,
$n \geq 0$, preferably 0, 1 or 2,
$p \geq 0$, preferably 0, 1 or 2,
$(n + p) \geq 1$, preferably 1 or 2,
Q is an aromatic group in the quinonoid form,
R is an aromatic or saturated aliphatic group having a functionality of $(m + n + p)$,
Y is an oxygen atom and X is an aromatic or saturated aliphatic group, or
YX is an aromatic or saturated aliphatic substituted amino group.

These urethanes may conveniently be prepared from di- or polyisocyanates having the formula R(.NCO)$_{m + n + p}$ The nature of the di- or poly-functional group R is not critical to this invention, and it will be noted that the group R is not altered during the preparation or reaction of the compounds of this invention. Any di- or poly-isocyanate may be used for this purpose. Examples of di-isocyanates which have been used are toluene-2,4-di-isocyanate, 4,4'-di-isocyanato-dicyclohexylmethane, methylene-bis-(4-phenylene-isocyanate), and 2,2,4-trimethyl-hexamethylene-1,6-di-isocyanate. An example of a tri-isocyanate is sold by Farbenfarbiken Bayer under the Trade Mark Desmodur R, which is 4,4',4''-triphenylmethane-triisocyanate. In addition to di-, tri- and higher poly-isocyanates, there are available mixtures having a non-integral average number of isocyanate groups per molecule. Such mixtures are also suitable starting materials for the preparation of compounds according to this invention.

The group (.NH.CO.O.N = Q = O) may be formed by the reaction of an isocyanate group with a nitroso-phenol, as explained above and as more fully described in our U.S. Pat. application Ser. No. 862,507 The nitrosophenol is one having a nitroso group attached to a carbon atom of an aromatic ring, particularly a benzene or naphthalene ring, and also having at least one hydroxyl group, such that the compound is capable of reaction in its oxime form with isocyanate. The aromatic ring may carry one or more alkyl groups, each containing up to four carbon atoms, provided that such substituents are not so large or so positioned as to prevent the functional group or groups from reacting with the isocyanate. We prefer to use 3-methyl-4-nitrosophenol.

The group (.NH.CO.Y.X) may be formed by the reaction of an isocyanate group with a molecule containing a hydroxyl group or a primary or secondary amino group. The reaction is of a kind which is well known, and may be represented thus:

R.NCO + HOX → R.NH.CO.O.X.
R.NCO + H$_2$NX → R.NH.CO.NH.X
R.NCO + HNXX' → R.NH.CO.NXX' where R and X are as defined above and X' is an organic group whose nature is unimportant provided that it does not inhibit the reaction.

The group X is an aromatic or saturated aliphatic group. Among aromatic compounds we prefer phenols and naphthols, optionally containing alkyl groups as nuclear substituents, for example, phenol, thymol and α-naphthol. Among aliphatic compounds, we prefer the alcohols and primary amines of saturated hydrocarbons, for example, ethyl alcohol and n-propylamine.

Alternatively, the starting compound of which X forms a part may be di- or poly-functional with respect to isocyanate. Examples of difunctional comounds include 2,2-di-(4-hydroxyphenyl)-propane (sold as Bisphenol A), and aliphatic diamines, e.g. decamethylenediamine.

There follows a discussion of the preparation of examples of various classes of compounds within the broad definition set out above.

A. $m \geq 1, n \geq 1, p = 0$. This class is exemplified by the isocyanatourethane formed from a di-isocyanate and a nitrosophenol O = N — C$_6$H$_4$ — OH ⇌ HO — N = C$_6$H$_4$ = O + OCN — R — NCO ⟶ OCN — R — NH.CO.O.N = C$_6$H$_4$ = O There is always the danger in this reaction of forming unwanted diurethane. For this reason it is preferable to employ at least two moles of di-isocyanate per mole of nitrosophenol, and to carry out the reaction at a temperature below that at which reversible thermal dissociation of the urethane becomes rapid. Thus, we perfer to carry out the reaction at temperatures below 120° C., preferably below 100° C, when using aliphatic diisocyanates, and below 100° C., preferably below 80° C., when using the more active aromatic diisocyanates.

Our preferred procedure is to dissolve the isocyanate in an inert organis solvent in which the urethane is insoluble, e.g. toluene, and to add the nitrosphenol to this solution. The nitrosophenol dissolves slowly, and the urethane comes out of solution as it is formed. It will be appreciated that the proportion of isocyanate is nitrosophenol in solution at any given moment is very high, so that is little danger of diurethane formation. After removal of the urethane by filtration, we have found that the isocyanate solution can readily be recycled for repeated re-use.

B. $m = 1, n = 0; p \geqslant 1$, Y is oxygen, X is an aromatic group.

These are products which may be formed by reacting a di- or poly-isocyanate with a phenol and with a nitrosophenol. The two reactions may be performed in either order, provided that a. the first reaction leaves at least one isocyanate group free per molecule, and b. the second reaction is performed under conditions which do not give rise to rapid reversible decomposition of the intermediate reaction product.

The reaction may be exemplified using TDI, phenol and nitrosphenol thus:

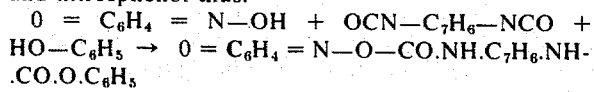

The reaction of phenol with isocyanate may be catalysed, e.g. with triethylenediamine. In the absence of a catalyst, this reaction requires temperatures of the order of 100° C., so that we would then prefer to treat phenol with TDI first, and the resulting product with nitrosophenol.

C. $m = 1, n = O, p \geqslant 1$, Y is oxygen, X is the radical of a dihydroxyphenol.

The formula of representative compounds in this class may be given as

where Q and R are as previously defined. They may be formed from the reaction of a di- or poly-isocaynate with a nitrosophenol and a dihydroxy phenol or bisphenol. As with compounds of class B, the two reactions of the isocyanate may be performed in either order.

D. $m = 1, n = 0, p \geqslant 1$, YX is an aromatic or saturated aliphatic substituted amino group. Compounds of this class are preferably prepared by reacting an isocyanatourethane of class A in the suitable solvent with an equivalent amount of a primary or secondary amine.

E. $m = 1, n = 0, p \geqslant 1$, Y is —NH—, X is difunctional —$(CH_2)_x$— where x is from 2 to 1,000 or more. The formula of representative compounds in this class may be given as

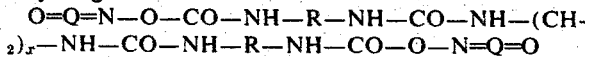

Compounds in this class may be prepared by reacting an isocyanatourethane with an aliphate diamine having the desired chain length.

The compounds of this invention are useful vulcanizing agents for natural rubber and for synthetic rubbers having unsaturated carbon chains. The invention accordingly includes a method of vulcanizing a natural or synthetic rubber having an unsaturated carbon chain, which method comprises heating a mixture of the rubber with from 1 to 20 pphr of a compound as herein defined at from 100° to 200° C. for from 6 hours to 10 seconds.

The vulcanization and other conditions may conveniently be as described in our U.S. Pat. application Ser. No. 862,507. In order to avoid porosity in the vulcanizate and loss of isocyanate, it may be desirable but not essential to add to the rubber mix a drying agent of such a nature and in such an amount as to remove the water by reacting chemically with it. Calcium oxide is an example of such a drying agent, and a suspension of calcium oxide in oil sold under the Trade Mark caloxol is particularly suitable.

Thorough mixing of the compound with the rubber is necessary, and this may conveniently be achieved by milling, for example, in an open mill or an internal mixer. Generally, milling on a cooled open mIll is preferable except when the free isocyanate groups of the compound are blocked as in classes B, C, D and E above. This cross-linking system may be used either alone, or in conjunction with other systems, e.g. using sulphur, in order to vulcanize the rubber, provided that the other vulcanizing ingredients do not interfere with the action of the compounds of this invention. The compounds of this invention may be added to the rubber before, together with, or after such other fillers, additives, or other compounding ingredients as may be determined for the subsequent application of the vulcanizate by the usual practice of the art.

The amount of the compound of this invention to be added to the rubber will depend upon the degree of cure required and can quite readily be determined by methods known in the art. Thus the proportion of the compound may be from 1 to 20, preferably from 5 to 15, parts by weight per hundred parts of dry rubber.

A most important advantage of the system over sulfur systems is that vulcanizates prepared according to it are virtually reversion-resistant. Conditions of cure are therefore not critical, provided always that the temperature of cure is sufficient to form in situ the nitroso compound and the di- or poly-isocyanate. Curing conditions may, for example, range from 100° to 200° C., for from 6 hours to 10 seconds, e.g. from 1 hour to 10 minutes.

The cross-linking efficiency of the system may be significantly improved by the addition of certain metal salts of thiols. Examples of such salts include zinc, cadmium and stannous dithiocarbamates, particularly dialkyldithiocarbamats, dithiophosphates, particularly dialkyldithiophosphates, and zincn benzothiazole thioate. It is to be expected that salts of other thiols and thio-acids, in which the (divalent) metal atom is directly bonded to sulphur, will also be effective. Among the salts, the preferred ones are zinc dimethyl-, diethyl- and di-n-butyl-dithiocarbamates on account of their ready availability.

The amount of the metal thio salt used is not critical, and may suitably be from 0.5 to 10, preferably 1 to 6, parts by weight per hundred parts by dry rubber. Generally, 2 parts of the salt are sufficient to give the desired efficiency increase, and there is little to be gained by going above this figure.

We believe that the heat supplied to vulcanize the rubber causes the compound of this invention to be split up into its component parts, which then react with and cross-link the rubber. Thus, isocyanatourethanes (when $p = 0$ as described in class A above) are believed to yield the free nitrosophenol and di- or poly-isocyanate; the nitrosophenol reacts with the rubber molecule forming pendent aminophenol groups, and the cross-links are completed by the poly-functional isocyanate molecules.

When the free isocyanate groups of the compounds of this invention are blocked, e.g. with phenols (i.e., when $n = 0$ and $O \geqslant 1$ as described in classes B, C, D and E above), the poly-functional isocyanate is not available to complete the cross-links until the bond with, e.g. the phenol, has been broken. The decomposition generally takes place at a higher temperature than the decomposition of the isocyanate-nitrosophenol bond, and thus reduces the risk of scorch.

Thus, a considerable degree of control over the rate and efficiency of vulcanization obtainable with a particular compound can be obtained by appropriate selection of the nitrosophenol and of the isocyanate, and by blocking free isocyanate groups with an appropriate phenol, alcohol or amine. For reasons of economy and of rate and efficiency of vulcanization, we prefer to prepare compounds from 3-methyl-4-nitrosophenol and either toluene-2,4-di-isocyanate or methylene-bis-(4-phenylene-isocyanate), and to block free isocyanate groups which phenol or naphthol.

The following Examples illustrate the invention. In the Examples, the following abbreviations are used.
TDI is toluene-2,4-di-isocyanate. -isocyanate.
MDI is methylene-bis-(4-phenylene-isocyanate)
Hylene W is 4,4'-di-isocaynato-dicyclohexylmethane
Desmodur R is 4,4', 4''-triphenylmethane-triisocyanate
Bisphenol A is 2,2-di-(4-hydroxyphenyl)-propane
SMR is Standard Malaysian Rubber
HAF is high abrasion furnace
Dutrex R is the Trade Name of a rubber processing oil
Caloxol C31 is the Trade Name of calcium oxide suspended in oil
ZDMC is zinc dimethyldithiocarbamate
BR is butadiene rubber (e.g. sold under the Trade Names Cis-4 and Intene 55)
SBR is styrene-butadiene rubber (e.g. sold under the Trade Name Intol 1500)
NBR is acrylonitrile-butadiene rubber (e.g. sold under the Trade Name Krynac 803)
CR is chloroprene rubber (e.g. sold under the Trade Name Neoprene WRT)
IR is isoprene rubber (e.g. sold under the Trade Name Natsyn)

Examples 1 and 2 illustrate the preparation of typical isocyanatourethanes carrying unblocked isocyanate groups.

EXAMPLE 1

Preparation of Isocyanatourethane from 4-nitrosophenol and TDI

4-Nitrosophenol (49.2 g) was stirred with a solution of TDI (348g) in toluene (1,200 ml) at room temperature for 2 hours under nitrogen. During this time the 4-nitrosophenol dissolved and a bright yellow precipitate formed. The precipitate was filtered off and washed with light petroleum (b.p. 40°–50° C.) to give, after pumping free of solvent, the product, 109g (92 percent), m.p. 138.5° – 145° C. (with decomposition). Infrared absorption bands at 2,280 (NCO), 1785 (oxime carbamate C=0), and 1,643 cm⁻¹ (quinone C=0).

Analysis $C_{15}H_{11}N_3O_4$ requires C, 60.6; H, 3.7; N, 14.1
found C, 60.9; H, 3.7; N, 13.8%

EXAMPLE 2

Preparation of isocyanatourethane from 4-nitrosophenol and MDI

4-Nitrosophenol (6.15 g) and MDI (62.5 g.) were stirred in toluene (375 ml) at 70° C. for 30 minutes under nitrogen. A yellow precipitate began to form almost immediately. The precipitate was filtered off and washed with toluene and light petroleum (b.p. 40°–60° C.) to give, after pumping free of solvent, the product, 14.6 g (78 percent), m.p. 116°–118° C.

Analysis $C_{21}H_{15}N_3O_4$ requires C, 67.5; H, 4.1; N, 11.2
found C, 67.3; H, 4.2; N, 10.8%

Examples 3 to 14 relate to the preparation of other unblocked isocyanatourethanes by methods similar to those used in Examples 1 and 2. Details are given in Table I.

TABLE I

ISOCYANATOURETHANES

| Example | Nitrosophenol | mole | Diisocyanate | mole | Solvent | Temp. °C. | Time, min. | Yield % | m.p. °C. |
|---|---|---|---|---|---|---|---|---|---|
| 1 | 4-nitrosophenol | 1 | TDI | 5 | Toluene | RT | 120 | 92 | 139–145 |
| 2 | do. | 1 | MDI | 5 | do. | 70 | 30 | 78 | 116–118 |
| 3 | do. | 1 | Hylene W | 5 | do. | 60 | 20 | | 85–87 |
| 4 | do. | 1 | Desmodur R | 3 | Dichloromethane | RT* | 180 | 94 | 80–82 |
| 5 | 3-methyl-4-nitrosophenol | 1 | TDI | 5 | Toluene | RT | 150 | 90 | 192–194 |
| 6 | 3-methyl-4-nitrosophenol | 1 | MDI | 5 | do. | RT | 120 | 95 | 150–152 |
| 7 | 2-methyl-4-nitrosophenol | 1 | TDI | 5 | do. | RT | 240 | 71 | 117–119 |
| 8 | 5-methyl-2-isopropyl-4-nitrosophenol | 1 | TDI | 5 | do. | RT* | 60 | 94 | 155–157 |
| 9 | 2-methyl-5-isopropyl-4-pitrosophenol | 1 | TDI | 5 | do. | RT | 240 | 84 | 129–131 |
| 10 | 3-isopropyl-4-nitrosophenol | 1 | TDI | 5 | do. | RT | 40 | 61 | 122–123 |
| 11 | 3,5-dimethyl-4-nitrosophenol | 1 | TDI | 5 | do. | RT | 180 | 73 | 171–173 |
| 12 | 2,6-dimethyl-4-nitrosophenol | 1 | TDI | 5 | do. | RT | 120 | 43 | 134–136 |
| 13 | 2,6-diisopropyl-4-nitrosophenol | 1 | TDI | 5 | do. | RT | 180 | 42 | 103–105 |
| 14 | 1-nitroso-2-naphthol | 1 | TDI | 5 | do. | RT | 90 | 61 | 151.5 |

*Triethylenediamine catalyst employed.

Example 15 illustrates the preparation of a typical isocyanatourethane in which the free isocyanate groups are blocked by phenol.

EXAMPLE 15

Phenol (47 g., 0.5 mole) and TDI (261 g., 1.5 mole) were stirred together in refluxing light petroleum (b.p. 100°–120° C.) (750 ml) for 5.5 hours. On being allowed to cool, the product crystallized and was filtered off (88 g, 66 percent). The mother liquor from this filtration was re-used as follows. A further 0.5 mole each of phenol and TDI were added to the mother liquor and the reactants refluxed as before. On cooling to room temperature colourless crystals of the product were formed (113 g, 85 percent). The mother liquor may be used for further reactions. The colourless crystalline product may be recrystallized from a 1:1 mixture of benzene and light petroleum (b.p. 60°–80° C.) and is believed to be the mono-adduct (of which there are two possible isomers) of phenol and TDI.

This mono-adduct (165 g, 0.62 mole) and 4-nitrosophenol (72 g, 0.59 mole) were stirred in toluene (2 l) for 60 minutes at 65° C. during which time a dense yellow precipitate had formed. This was filtered off and washed with toluene. Yield of "mixed" adduct: 217 g (94 percent), m.p. 189° C. Infrared absorption bands at 1,760 (oxime carbamate C=O), 1,747 (urethane C=O), 1,650 cm$^{-1}$ (quinone C=O).

Other phenol-blocked isocyanatourethanes were made similarly. Details are given in Table II. In all cases, equimolar proportions of the nitrosophenol and the mono-adduct of phenol and TDI described in Example 15 were reacted together in toluene.

TABLE II

Phenol Blocked Compounds

| Example | Nitrosophenol | Temp. °C. | Time (min.) | Yield % | m.p. °C. |
|---|---|---|---|---|---|
| 15 | 4-nitrosophenol | 65 | 60 | 94 | 189 |
| 16 | 3-methyl-4-nitrosophenol | 65 | 90 | 92 | 195–197 |
| 17 | 2-methyl-4-nitrosophenol | 70 | 120 | 83 | 185 |
| 18 | 3,5-dimethyl-4-nitrosophenol | 65 | 120 | 90 | 137–139 |
| 19 | 2,6-di-isopropyl-4-nitroso- | 65 | 150 | 78 | 133–134 |
| 20 | 2-tert-butyl-4-nitrosophenol | 65 | 240 | 76 | 152–153 |

Example 15 was repeated using 3-methyl-4-nitrosophenol in place of 4-nitrosophenol and using various blocking compounds. The results are given in Table III.

TABLE III

Blocked Compounds

| Example | Blocking Compound | Temp. °C. | Time (min.) | Yield % | m.p. °C. |
|---|---|---|---|---|---|
| 21 | phenol | 65 | 90 | 92 | 195–197 |
| 22 | thymol | 70–80 | 360 | 55 | 156 |
| 23 | 2-naphthol | 60–70 | 120 | 90 | 178 |
| 24 | ethanol | 70–80 | 20 | 78 | 156 |

EXAMPLE 25 n-Propylamine (1.77 g., 0.03 mole) in dichloromethane (100 ml.) was added dropwise over 0.5 hour at room temperature to the isocyanatourethane of Example 1 (8.91 g., 0.03 mole) in dichloromethane (100 ml.). The red precipitate formed was filtered off, washed with dichloromethane and pumped free of solvent to give 8.1 g. (76 percent) of product, m.p. 150°–160° C.

Examples 26 to 28 relate to the preparation of blocked isocyanatourethanes using difunctional blocking agents.

EXAMPLE 26

Bis-phenol A (1.14 g, 0.005 mole) and TDI (17.4 g, 0.1 mole) were warmed with stirring to 40° C. for 2 hours in toluene (20 ml) and in the presence of triethylenediamine (0.02 g, 4 mole percent with respect to bisphenol A) as catalyst. On cooling, the product was precipitated by addition of light petroleum (b.p. 60°–80° C.). The white coarse powder obtained, believed to be mainly the bis TDI adduct bis-phenol A, was purified by prolonged extraction with light petroleum (b.p. 60°–80° C.). The product (0.576 g) was stirred with chloroform (25 ml) and the insoluble material filtered off. To the filtrate was added 4-nitrosophenol (0.18 g, 0.00146 mole) and the mixture refluxed for 1 hour with stirring. The resulting yellow chloroform solution was decanted into light petroleum (b.p. 40°–60° C.) to precipitate a yellow solid which, after filtering, was pumped free of solvent. The product, 0.4 g. (67 percent), m.p. 108°–115° C. is believed to possess the structure $$(CH_3)_2C(-C_6H_4-O-CO-NH-C_7H_6-NH-CO-O-N=C_6H_4=O)_2$$

and showed infrared absorption bands at 1,745 (oxime carbamate C=O), 1,730 (urethane C=O), and 1,650 cm$^{-1}$ (quinone C=O).

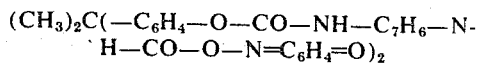

Analysis $C_{45}H_{38}N_6O_{10}$ requires C, 65.7; H, 4.7; N, 10.2
found C, 65.6; H, 5.0; N, 9.9%

EXAMPLE 27

The isocyanatourethane of Example 1 (2.97 g, 0.01 mole) and bisphenol A (1.14 g, 0.005 mole) were warmed with stirring to 40° C. for 1 hour in chloroform (25 ml) and in the presence of triethylenediamine (0.03 g, 5 mole percent with respect to bis-phenol A) as catalyst. During the reaction the reagents slowly dissolved. On cooling to room temperature, the solution was poured into light petroleum (b.p. 40°–60° C.) (300 ml) with stirring. A yellow solid was precipitated which, after filtration, was pumped free of solvent to yield 4.08 g (99.4 percent) of the product obtained in Example 26, m.p. 108°–115° C.

EXAMPLE 28

Decamethylenediamine (2.58 g, 0.015 mole) in dichloromethane (100 ml) was added slowly over a period of 20 minutes to a stirred suspension of the isocyanatourethane of Example 1 (8.91 g, 0.03 mole) in dichloromethane (200 ml). After addition the reaction mixture was warmed to 40° C. for 15 minutes. On cooling the product was filtered off and, after washing three times with dichloromethane, was pumped free of solvent. Yield, 9.6 g (84 percent).

The urethanes of Examples 1 to 28 were used as vulcanizing agents in various gum and filled natural and synthetic rubber formulations. For Examples 29 and 30, the following standard black-filled natural rubber formulation was used:

| | |
|---|---|
| Natural rubber (SMR 5) | 100 |
| HAF black | 50 |
| Dutrex R | 4 |
| Caloxol C31 | 5 |
| ZDMC | 2 |
| Vulcanizing agent | varies |

EXAMPLE 29

The above standard formulation was used with 8 pphr of the isocyanatourethane of Example 1, and was cured at 140° C. for 20 minutes. The initial properties of the vulcanizate were as follows:

| | |
|---|---|
| Hardness, °BS | 68 |
| Relaxed Modulus, MR 100, MN/m² | 2.54 |
| Tensile Strength, MN/m² | 26.2 |
| Elongation at break, % | 415 |
| Tear Strength (max.), N/mm | 17.6 |
| Dunlop Resilience, % | 73.1 |

EXAMPLE 30

The above standard rubber formulation was vulcanized using generally equivalent concentrations of various different unblocked and blocked isocyanatourethanes. The Relaxed Moduli MR 100 of the vulcanizates are given in Table IV below, and provide an indication of the degree of cross-linking achieved. The vulcanization conditions are not critcal, since the vulcanizates are virtually reversion-free. These experiments were intended to demonstrate that vulcanization took place without attempting to optimise the conditions. Vulcanization conditions were 60 min. at 150° C., except for Example 1 (20 min. at 140° C.) and Example 15 (60 min. at 140° C.).

TABLE IV

| Isocyanate of Example | Concentration pphr | MR 100 (MN/m²) of Vulcanizate |
|---|---|---|
| 1 | 8 | 2.54 |
| 5 | 9 | 2.39 |
| 7 | 9 | 2.49 |
| 10 | 9.8 | 1.41 |
| 11 | 9.4 | 1.21 |
| 12 | 9.4 | 2.20 |
| 13 | 11.0 | 1.71 |
| 15 | 10.5 | 3.12 |
| 16 | 11.7 | 2.33 |
| 17 | 11.7 | 2.54 |
| 19 | 13.7 | 1.34 |
| 20 | 12.9 | 1.92 |
| 21 | 11.7 | 2.33 |
| 22 | 13.3 | 1.83 |
| 23 | 13.1 | 1.60 |
| 24 | 10.3 | 1.21 |

EXAMPLE 31

The isocyanatourethanes of Examples 1 and 2 were used to prepare natural rubber gum vulcanizates, whose tensile properties are reported in Tables V and VI below.

Table V

NR gum vulcanizates cured with product of Example 1

| Compounding Ingredients | | | | | | | | |
|---|---|---|---|---|---|---|---|---|
| SMR 5 | 100 | 100 | 100 | 100 | 100 | 100 | 100 | 100 |
| Caloxol C31 | 5 | 5 | 5 | 5 | 5 | 5 | 5 | 5 |
| ZDMC | 2 | 2 | 2 | 2 | 2 | 2 | 2 | 2 |
| Product of Example 1 | 3 | 4 | 5 | 6 | 7 | 8 | 9 | 10 |
| Cure, min. at 140° C. | 20 | 20 | 20 | 20 | 20 | 20 | 20 | 20 |
| Initial vulcanizate properites | | | | | | | | |
| Relaxed modulus, MR 100, MN/m² | 0.50 | 0.61 | 0.71 | 0.81 | 0.90 | 1.04 | 1.12 | 1.23 |
| Tensile Strength, MN/m² | 20.8 | 20.5 | 18.4 | 23.6 | 21.7 | 26.5 | 28.3 | 21.6 |
| Elongation at break, % | 792 | 689 | 589 | 654 | 532 | 570 | 563 | 494 |

Table VI

NR gum vulcanizates cured with product of Example 2

| Compounding Ingredients | | | | | | | | |
|---|---|---|---|---|---|---|---|---|
| SMR 5 | 100 | 100 | 100 | 100 | 100 | 100 | 100 | 100 |
| Caloxol C31 | 5 | 5 | 5 | 5 | 5 | 5 | 5 | 5 |
| ZDMC | 2 | 2 | 2 | 2 | 2 | 2 | 2 | 2 |
| Product of Example 2 | 2 | 3 | 4 | 5 | 6 | 7 | 8 | 9 |
| Cure, min. at 150°C. | 40 | 40 | 40 | 40 | 40 | 40 | 40 | 40 |
| Initial vulcanizate properties | | | | | | | | |
| Relaxed modulus, MR 100, MN/m² | 0.35 | 0.45 | 0.56 | 0.64 | 0.76 | 0.85 | 0.96 | 1.01 |
| Tensile Strength, MN/m² | 9.3 | 14.4 | 19.6 | 20.1 | 16.0 | 20.1 | 22.8 | 17.9 |
| Elongation at break, % | 784 | 813 | 778 | 721 | 629 | 634 | 620 | 548 |

EXAMPLE 32

This Example demonstrates the ability of the compounds of this invention to vulcanize synthetic rubbers having unsaturated carbon-chains. Formulations are given in Table VII below. In all cases, the vulcanizing agent was the unblocked isocyanatourethane from 3-methyl-4-nitrosophenol and TDI. Mooney Scorch (at 10 pphr of vulcanizing agent) and Relaxed Modulus (at varying proportions of vulcanizing agent) are also given in the Table. In considering the scorch times, it should be borne in mind that curing with these isocyanatourethanes takes place progressively over a period of time, in contrast to the sudden delayed action curing which is typical of sulphur systems. The vulcanization conditions were 2 hours at 150° C., except for CR (6 hours at 150° C.).

TABLE VII

SYNTHETIC RUBBERS

| | Rubber | HAF black | Dutrex R | Caloxol C31 | ZDMC | MOONEY SCORCH | | MODULUS | |
|---|---|---|---|---|---|---|---|---|---|
| | | | | | | Isocyanato-urethane pphr | (t+5) 120°C. min. | Isocyanato-urethane pphr | MR 100, MN/m² |
| BR (Cis-4 | 100 | 50 | 4 | 5 | 2 | 10 | 5 | 6 | 1.99 |
| (Intene 55 | 100 | 50 | 4 | 5 | 2 | 10 | 7_6 | 1.77 | |
| SBR Intol 1500 | 100 | 50 | 4 | 5 | 2 | 10 | 12.5 | 10 | 1.61 |
| NBR Krynac 803 | 100 | 50 | 4 | 5 | 2 | 10 | 11.5 | 15 | 1.38 |
| CR Neoprene WRT | 100 | 50 | 4 | None | 2 | 10 | Immediate | 9 | 4.87 |
| IR Natsyn | 100 | 50 | 4 | 5 | 2 | 10 | 15 | 10 | 1.37 |

EXAMPLE 33

This Example demonstrates the vulcanizing ability of the compounds of certain Examples by reference to the Mooney Scorch times in a standard unfilled natural rubber formulation containing Caloxol C31 (5 pphr) and ZDMC (2 pphr). Results are set out in Table VIII below.

Table VIII

| Product of Example 1 | Concentration (pphr) | Mooney Scorch at 120°C. | |
|---|---|---|---|
| | | (t + 5) min. | (t+ 35) min. |
| 14 | 6 | 4.5 | 6.0 |
| 24 | 5.4 | 4.5 | 7.5 |
| 25 | 10.5 | 4.0 | 8.0 |
| 27 | 11.5 | 4.5 | 8.5 |

We claim:

1. A compound having the formula: $R(.NH.CO.O.N=Q=O)_m(.NCO)_n(.NH.CO.YX)_p$
where
   m is 1 or 2
   n is 0, 1 or 2
   p is 0, 1 or 2
   (n + p) is 1 or 2
   Q is benzene, benzene substituted by one or more alkyl groups of up to four carbon atoms or naphthalene, and is in the p-quinonoid form
   R is an aromatic or saturated aliphatic hydrocarbon group having a functionality of (m + n + p)
   Y is an oxygen atom and X is phenyl, alkylphenyl, naphthyl, alkylnaphthyl, aliphatic saturated hydrocarbyl

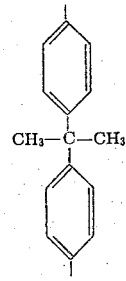

or
   YX is primary aliphatic saturated hydrocarbyl amino.

2. A compound as claimed in claim 1, wherein Q is a benzene ring in its para-quinonoid form or a naphthalene ring system in a quinonoid form.

3. A compound as claimed in claim 1 wherein R is

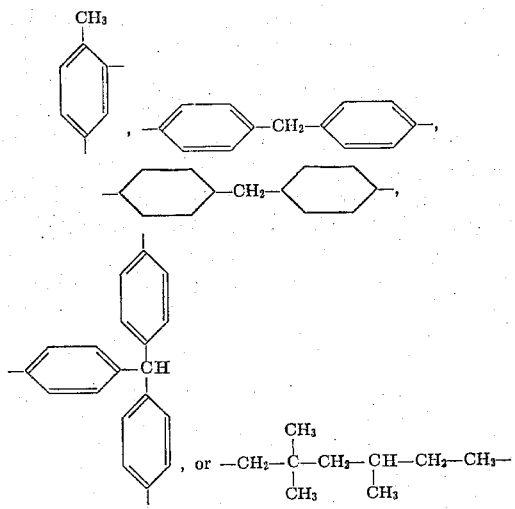

4. A compound as claimed in claim 1, wherein
   m is 1
   n is 0 or 1
   p is 0 or 1
   (n + p) is 1
   Q is a benzene ring in its para-quinonoid form with or without a methyl group attached in a position ortho to the adjacent nitorgen atom,
   R is toluene-2,4- or methylene-bis(4-phenylene-),
   X is an aromatic group, and
   Y is an oxygen atom.

* * * * *